United States Patent [19]

Klann

[11] Patent Number: 4,541,614
[45] Date of Patent: Sep. 17, 1985

[54] SPRING CRAMP, PARTICULARLY FOR AXLE SPRINGS OF MOTOR VEHICLES

[76] Inventor: Horst Klann, Terra Wohnpark 12, Villengen-Schwenningen 24, Fed. Rep. of Germany

[21] Appl. No.: 657,343

[22] Filed: Oct. 3, 1984

[30] Foreign Application Priority Data

Oct. 4, 1983 [DE] Fed. Rep. of Germany ....... 3335979

[51] Int. Cl.$^4$ ............................................. B23P 19/04
[52] U.S. Cl. ...................................... 254/10.5; 29/227
[58] Field of Search ......................... 254/10.5; 29/227

[56] References Cited

U.S. PATENT DOCUMENTS

| | | | |
|---|---|---|---|
| 4,034,960 | 7/1977 | Kloster | 254/10.5 |
| 4,036,473 | 7/1977 | Kloster | 254/10.5 |
| 4,219,918 | 9/1980 | Klann | 29/227 |

Primary Examiner—Robert C. Watson
Attorney, Agent, or Firm—McGlew and Tuttle

[57] ABSTRACT

To substantially reduce the stock of spring cramp sizes needed for holding and clamping axle springs of motor vehicles having widely varying diameters, the clamping jaws of a spring cramp have a contact surface which is substantially flat and, at least in the zone of median plane of the jaw and over the entire jaw leg leading in the clamping direction, slightly slanting inwardly by an angle α of from 2.5° to 6°, so that the radially outer edge of jaw leg trails behind the inner one during a clamping operation. In addition, a backing rib is provided projecting substantially symmetrically from the inner edge of each clamping jaw axially in the clamping direction, which rib extends through a center angle β of from 30° to 100°. At their free ends, the jaw legs are about 1.5 to 2 times wider than in the zone of their median plane.

8 Claims, 7 Drawing Figures

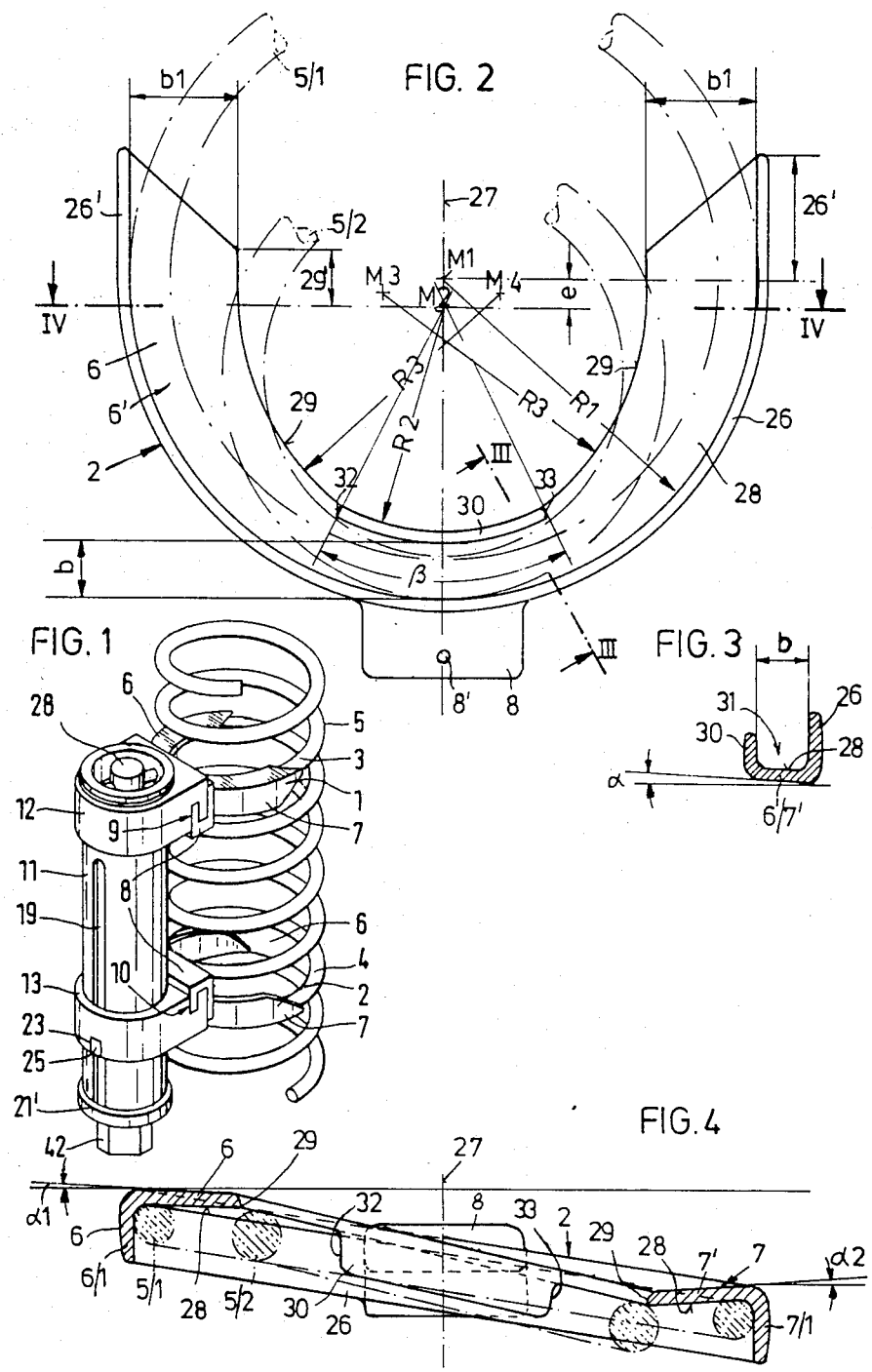

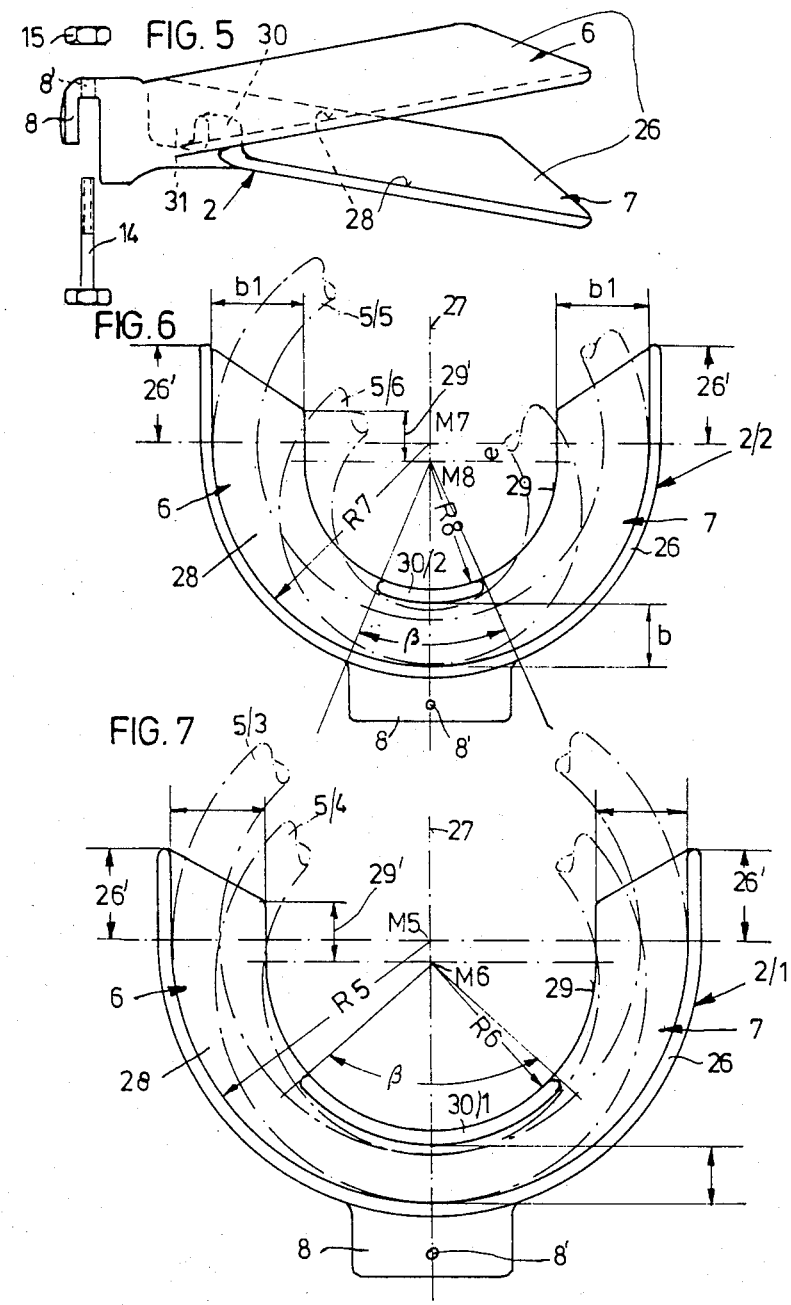

SPRING CRAMP, PARTICULARLY FOR AXLE SPRINGS OF MOTOR VEHICLES

FIELD AND BACKROUND OF THE INVENTION

This invention relates in general to spring cramps and in particular to a new and useful spring cramp and clamping jaw therefor which is suitable for many sizes of springs.

Spring cramps of this kind are known such as disclosed in German Pat. No. 28 13 381, German OS No. 2652 820, for example. These prior art cramps comprise clamping jaws in the shape of annular sectors extending through an angle of about 230° and being flanged along almost their entire length, on both their inside and their outside, with axially extending side walls so that a channel section is formed. The helically inclined contact surface of the jaws is substantially perpendicular to the median plane thereof. Such clamping jaws are well suited for receiving compression springs having a diameter corresponding to the mean diameter of the contact surface of the clamping jaw, and a thickness not exceeding the width of the jaw. However, since the springs vary widely in size, such clamping jaws are not satisfactory since they fit each only a certain size, with very small tolerances, and a large assortment is therefore to be held in stock. In motor vehicles, helical compression springs are in use ranging from a very large outer diameter of 240 mm, inner diameter of 210 mm, and a wire thickness of 15 mm, to a very small outer diameter of 120 mm, and inner diameter of 100 mm. To cover all these spring sizes, at least five sizes of clamping jaws were hitherto needed, and their safety in use has frequently been unsatisfactory, especially in limit cases.

SUMMARY OF THE INVENTION

The present invention is directed to spring cramps having clamping jaws of a shape making them suitable for a wide range of spring sizes, so as to substantially reduce the stock needed for the springs used for motor vehicle axles. For example, three different sizes of spring cramps should be capable of clamping all the spring sizes occurring in this respect in practice.

To this end the invention provides that circularly extending legs, which are symmetrical relative to a median plane of the jaws, and further having a continuous helically oblique surface for engaging respective portions of the spring coils, and that along its inner edge, each jaw is provided with an axially projecting backing rib which extends through a center angle of 30° to 100° and at least substantially symmetrically of the median plane of the jaw.

The contact surface engaged in the respective turn of the spring to be clamped forms an outwardly sloping inclined plane producing a certain centering effect and frictionally counteracting the enlargement of the spring diameter occurring during the clamping. The backing rib extending through an angle of 100° at most and thus being substantially shorter than similar ribs in prior art spring cramps, makes it possible, however, to handle even compression springs having a radius which is smaller than the radius of curvature of the backing rib or of the inner boundary edge of the jaw end. This means that with an inventive spring cramp, springs of widely different sizes can safely be clamped.

At the same time, it is advantageous if the angle of inclination of the contact surface of the jaw leg leading in the clamping direction is larger, since this may prevent the jaw leg trailing in the clamping direction, especially on springs having minimum inside diameters, from applying only against the inner boundary edge of the jaw.

Another advantageous feature of the invention, enlarging the contact surface and thus improving the guidance of the spring turn by the clamping jaw is that on their free ends, the jaw legs are 1.5 to 2 times wider than in the zone of the median plane of the jaw. This results in a further advantage that the clamping jaw can be easily engaged on the not yet clamped spring and centered during the starting phase of the clamping operation.

This advantage may still be increased by providing that the outer and inner arcuate edges of the jaws extend only through 180° and then blend into mutually parallel straight edge portions which, at the outside, correspond about to the maximum width of the jaw, and at the inside to about half the width.

To obtain a maximum anchoring safety for the spring turn seized by a clamping jaw it is important to have the end edges of the backing rib extending at least approximately in the axial direction, or at right angles to the inner edge of the adjacent jaw leg, to enable the respective spring turn to apply against these edges as to centering stops.

Still another inventive feature is that at least the contact surface is provided with a coating which is softer than the contact surface itself, preferably a thermoplastic layer. This reduces the hazard of a slip of the clamped spring turn and makes sure that during the clamping operation, the skin or surface of the spring turn will not be damaged.

Accordingly, it is an object of the invention to provide a clamping jaw for a spring clamp which is of a construction such that it accommodates a wide range of springs.

A further object of the invention is to provide a spring cramp and a clamping jaw therefrom which are simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the acompanying drawings and descriptive matter in which preferred embodiments of the invention are illustrated.

BRIEF DESCRIPTION OF THE DRAWINGS

In the drawings:

FIG. 1 is a perspective view of a spring cramp, with a helical compression spring clamped therein;

FIG. 2 is an enlarged top plan view of a clamping jaw;

FIG. 3 is a sectional view taken along the line III—III of FIG. 2;

FIG. 4 is a sectional view taken along the line IV—IV of FIG. 2;

FIG. 5 is a side view in the direction A of FIG. 2, and

FIGS. 6 and 7 are views similar to FIG. 2 showing two other clamping jaws of different size.

DESCRIPTION OF THE PREFERRED EMBODIMENTS

Referring to the drawings in particular the invention embodied therein comprises clamping jaw 1 and 2 for a cramp spring which includes a guide tube 11 having first and second slide members 12 and 13 which are relatively movably mounted on the guide tube 11. Drive means in the form of an engageable nut 42 may be rotated for moving the slide members 12 and 13 relatively. In the embodiment shown, the slide member 12 is fixed to the guide tube 11 and the other member 13 is movable toward and away from this member as desired. Each of the slide members 12 and 13 carry a clamping jaw 1 and 2 which are arranged in opposite facing arrangement for engaging the coil spring at spaced apart coils thereof.

The spring cramp shown in FIG. 1 comprises two clamping jaws 1,2 which are oppositely symmetrical and mounted in register with each other. They have substantially a horseshoe shape and are designed for engaging each a turn 3 or 4 of a helical compression spring 5. The particular shape of jaws 1, 2 will be explained in more detail hereafter in connection with FIGS. 2-7. In conformity with the pitch of the helical compression spring 5 to be clamped, the two clamping jaws 1, 2 are helically oblique, to the effect that, considered in the axial direction of the cramp or the spring, one leg 6 of a clamping jaw extends obliquely downwardly, and the other leg 7 extends obliquely upwardly (see also FIG. 5). The two clamping jaws 1,2 are substantially of the same design, and they are provided each with a hook-shaped bracket 8 by which they positively engage a fitting cross-groove 9,10 provided in a collar 12,13 which is mounted on a guide tube 11. This positive engagement is secured by means of unscrewable bolts 14 and nuts 15.

Collar 12 is fixed to the upper end of guide tube 11 and secured against rotation and axial displacement. Guide tube 11 is provided with two diametrally opposite axial slots 19 which extend from below upper collar 12 down to the front edge of guide tube 11. Collar 13 is mounted on tube 11 for axial displacement with a slight fit, and is provided, in the area of the two axial slots 19, with correspondingly wide recesses 23 thorugh which project cross sectionally adapted radial fingers 25 of a slide ring (not shown) and which are movable inside of guide tube 11.

The slide ring has a central tapped hole in which a threaded spindle 38 centrally extending through guide tube 11 is screwed. By turning spindle 38 in one or the other direction the slide ring, along with the collar 13 and clamping jaw 2, is movable along guide tube 11. For this purpose, a hexagon head 42 is provided on the lower end of the spindle 38, to be engaged by a wrench. The lower end of guide tube 11 carries a cap 21' screwed thereon. The cross brackets 8 of the two clamping jaws 1 and 2 are provided with bores 8' for receiving screws 14.

Since the two clamping jaws 1, 2 are identical, only of mirror inverted design, the particular shape of an inventive clamping jaw will be explained in the following only for jaw 2 which is secured to movable collar 13 and shown in FIGS. 2, 3 and 5-7. Clamping jaw 2 is a jaw provided for particularly large helical compression springs 5/1 having an outer diameter of up to 240 mm. It is intended however, to employ the same jaw 2 for clamping helical compression springs 5/2 having an outer diameter as small as 190 mm and an inside diameter of about 160 mm. To make this possible while still insuring a satisfactorily safe seat of the clamped spring in the cramp, the following special features are provided:

The two legs 6 and 7 giving the jaw the basic shape of horseshoe are L sections, as may best be seen in FIG. 4, with one leg of the L section 6', 6/1 extending substantially horizontally or radially, and the other 7', 7/1 substantially vertically or axially. The vertical or axial legs of the sections form together a circular boundary wall 26. The two legs 6,7 of clamping jaw 2 join in the jaw center in a plane 27 further called median plane of the jaw. The side visible in FIG. 2 of the jaw legs forms a contact surface 28 which is not only conformed to the extension of the helical turn of a spring 5/1, 5/2 to be clamped, but also is inclined crosswise by an angle $\alpha$ of 2.5° to 6° relative to the horizontal. This inclination of the contact surface 28 is so oriented that in the axial direction of the clamp, the radially outer portion of the surface trails behind the inner edge 29 of the jaw. Due to this slant, a centering effect is produced on the engaged spring turn 5/1, 5/2 by the clamping jaw, so that a better and safer seat of the respective spring turn portion in the jaw is ensured. In the zone of median plan 27, a backing rib 30 is provided which extends along the inner edge 29 of the jaw symmetrically of median plane 27, through a center angle $\beta$ of about 55° and parallel to, and in the same direction as, boundary wall 26. Due to the relatively short and symmetrical extension of backing rib 30, even helical springs 5/2 having relatively small inside diameters can be engaged and clamped, so that the cramp is suitable for a relatively large range of spring diameters. It is of substantial importance that in the zone of backing rib 30, the width b of the groove 31 formed between boundary wall 26 and rib 30 is about ½ of the width of the jaws at their free ends. Due to this enlargement of contact surface 28 toward the jaw leg ends, which is obtained by proper choosing the radii of curvature R1,R2,R3 of the limiting surface and displacing the centers M1, M2,M3 and M4 of radii R1, R2, R3, it is made sure that even helical compression springs 5/2 having the minimum possible diameter will still repose on contact surface 28 over a length which exceeds one half of the length of a turn. In addition, due to the reduction of the widths b of the surface in the zone of median plane 27, or of groove 21, the radial play of the spring turn at this location is reduced to an amount securing a satisfactory guidance of the spring turn but non obstructing the insertion of smaller springs. To also compensate for the fact that during a clamping of the spring, the pitch of the turns decreases, and to obtain a satisfactory seat of the spring turn on surface 28 also with varying pitches, it may be advantageous to provide different inclinations of contact surface 28 in the end portions of the tubes, for example $\alpha 1$ and $\alpha 2$, and still another inclination in the zone of median plane 27 to the effect of making angle $\alpha 2$ of jaws 6,7 leading in the axial direction, larger than angle $\alpha 1$ of leg 7. Angle $\alpha 1$ may thus amount to 2° and angle $\alpha 2$ to 5°, for example.

As shown in FIG. 2, the inner edges 29 of the jaw at boundary wall 26 are circularly arcuate only up to the level of the respective centers of curvature M1, M3, M4 associated with radii R1 and R3, thus through a total angle of 180°. Beyond, they extend in straight lines parallel to each other. The straight end portions 26' of boundary wall 26 have an extension about equal to width b1 of the jaw in this area, and the straight end portions 29' of the inner edge 29 of the jaw are about half that width b1.

Another important feature improving the safe hold is that the lateral limiting edges 32, 33 of backing rib 30 extend at least substantially axially, i.e. at right angles to the respective adjacent area of contact surface 28, which is to prevent the spring turn engaged in groove 31, from slipping out over backing rib 30.

The centers M1, M2 of radii of curvature R1, R2 lie in median plane 27 and are displaced from each other by the distance e. The two centers M3, M4 of radii of curvature R3 of inner edge 29 of the two jaw legs 6,7 lie outside median plane 27, symmetrically at either side thereof, at mutually equal distances, which results in the horizontal outline of clamping jaw 2 as shown in FIG. 2.

The inner radius R1 of boundary wall 26 of the jaw shown in FIG. 2 is 120 mm, in accordance with the outer radius of the largest helical compression spring 5/1 to be clamped with this clamp, while the inner radius of rib 30 is about 84 mm. The two mutually equal radii of curvature R3 are about 100 mm long.

Clamping jaw 2/1 of the FIG. 7 is intended for helical compression springs of medium size, i.e. for springs 5/3 having a maximum outer diameter of 195 mm, and such springs 5/4 having a minimum inner diameter of 132 mm. The inner edge 29 of this jaw has a radius of curvature R6 which is constant throughout and has its center M6 in median plane 27 as does center M5 of the inner radius of curvature R5 of boundary wall 26. Radius R5 corresponds to the outer diameter of the largest compression spring 5/3 to be clamped, namely 97.5 mm, while radius R6 is about 62 mm. The two centers M5, M6 of the radii are spaced from each other by a distance e in this instance about 80 mm, which is less than in the case of the jaw according to FIG. 2, where this distance e is about 12 mm. These dimensions result in a width b of about 20 mm in the zone of median plane 27, and of about 34 mm at the ends of jaw legs 6,7.

Tests have shown that with clamping jaws of this size, a backing rib 30/1 extending through a center angle $\beta$ of about 100° is most suitable for obtaining the best engagement and safe hold even of the smallest springs 5/4 which can be handled therewith. This clamping jaw 2/1 again, as does clamping jaw 2, has unequal angles of inclination $\alpha 1$ and $\alpha 2$.

Clamping jaw 2/2 shown in FIG. 6 is intended for particularly small helical compression springs 5/5 and 5/6. The design is substantially the same as according to FIG. 2. The most important difference is that a backing rib 30/2 is provided extending through a center angle of only about 50°, so that even helical compression springs 5/6 having extremely small inner diameters of about 100 mm can be engaged by this clamp, while the maximum outer diameter to be handled by this clamping jaw is about 165 mm. The corresponding inner radius R7 of boundary wall 26 is 82.5 mm, the radius R6 of inner edge 29 is 48 mm, and the two centers M7, M8 in median plane 27 are mutually spaced by a distance e of about 3 mm. This results in a groove width b of about 20 mm and a width b' at the jaw ends of 33.5 mm. Again, the contact surface 28 of this clamping jaw 2/2 is inclined, in the same manner as in the embodiment of FIG. 2.

To make the showing clear, the springs 5/1 to 5/6 to be clamped are indicated in FIGS. 2, 4, 6 and 7 in dash dotted lines.

In order not to damage the surface of the clamped springs, but also to obtain a better static friction, all surfaces of clamping jaws 2, 2/1 and 2/2 which may come into contact with a spring turn, are coated with a thermoplastic material (not shown).

It will be understood from the above description that due to the invention, virtually all helical compression springs employed in practice in motor vehicles, i.e. having sizes between a maximum outer diameter of 260 mm and a minimum inner diameter of 100 mm, can be handled with a spring cramp in accordance with the invention, while achieving the required safety.

While specific embodiments of the invention have been shown and described in detail to illustrate the application of the principles of the invention, it will be understood that the invention may be embodied otherwise without departing from such principles.

What is claimed is:

1. A cramp for a coiled spring comprising a guide tube, first and second slide members relatively movably mounted on said guide tube, means associated with said guide tube for moving said slide members relatively, a clamping jaw carried by each of said spring members arranged in opposite facing arrangement for engaging the spring at successive coils arranged therebetween, each jaw member having a median plane and a circularly extending leg on each side of said median plane and with a continuous oblique spring coil contact surface for engaging respective spring coils, a circularly cylindrical outer wall extending outwardly in an axial direction toward the respective other clamping jaw from and bounding the radial outer side of said contact surface, an axially projecting backing rib bounding the inner edge of said contact surface and having a circumferential extension such that it extends at least from 30° up to 100° of arc measured from the center of said jaw, said backing rib being cylindrical relative to said median plane, said legs having end portions adjacent their ends which are 1½ to 2 times wider than its central portion between said end portions, said contact surface being arcuate through 180° and having substantially parallel edges beyond 180°.

2. A cramp according to claim 1, wherein said contact surface is substantially flat at least in the zone of median plane thereof and wherein one leg portion extending in the clamping direction due to the obliqueness of the jaw having an angle of inclination of from betwen 2½ to 6° and wherein during a clamping motion the radial outer portion of said contact surface trails relative to the radially inner portion thereof.

3. A cramp according to claim 1, wherein the angle of inclination of said contact surface of said jaw leg leading in the cramping direction exceeds an angle of inclination of the other jaw leg.

4. A cramp according to claim 1, wherein the length of the outer edge of the straight free end portion of each clamping jaw has a maximum width and the length of the inner jaw edge of the straight free end portion of the clamping jaw is about half its width.

5. A cramp according to claim 1, wherein the end edges of said backing rib extends at least approximately axially and at right angles to the adjacent inner edge of the respective jaw leg.

6. A cramp according to claim 1, wherein at least the contact surface is provided with a coating which is softer than the contact surface itself.

7. A cramp according to claim 6, wherein said coating comprises a layer of thermoplastic material.

8. A clamping jaw for a cramp for a coiled spring, comprising a jaw member having a median plane and a circularly extending leg on each side of said median plane with a continuous helically oblique spring coil contact surface for engaging respective portions of the spring coils, a circularly cylindrical outer wall extending outwardly from said contact surface and bounding the radial outer side of said contact surface, an axially projecting backing rib bounding the inner edge of said contact surface and having a circumferential extension such that it extends at least from 30° up to 100° of arc measured from the center of said jaw member and being symmetrical relative to said median plane, said legs having end portions adjacent their ends which are 1½ to 2 times wider than its central portion between said end portions, said contact surface being arcuate through 180° and having substantially parallel edges on each side beyond 180°.

* * * * *